United States Patent Office 3,481,029
Patented Dec. 2, 1969

3,481,029
SOLID ELECTROLYTE CAPACITOR PROCESS
Raymond B. Wittke, Adams, Mass., assignor to Sprague Electric Company, North Adams, Mass., a corporation of Massachusetts
Filed May 16, 1967, Ser. No. 638,863
Int. Cl. H01g 9/00
U.S. Cl. 29—570                                                12 Claims

ABSTRACT OF THE DISCLOSURE

Immersing a porous, valve-metal body which has a thin layer of valve-metal oxide on the surfaces thereof and preferably a thin layer of a semiconducting oxide on the surface of said valve-metal oxide onto a $$Mn(NO_3)_2\text{-}SiO_2$$

sol, removing the $Mn(NO_3)_2$-$SiO_2$ coated unit and pyrolytically decomposing said coating to the semiconducting oxide with simultaneous deposition of the same on the surfaces of said body.

BACKGROUND OF THE INVENTION

This invention pertains to a method of preparing a solid electrolyte capacitor and more particularly to the preparation of a solid electrolyte tantalum capacitor.

Solid electrolyte capacitors comprise a porous sintered anode, the surfaces of which have a dielectric oxide thereon and a solid electrolyte of a semiconducting material in intimate contact with the dielectric. A cathode contact is in communication with the solid electrolyte to complete the capacitor.

The solid electrolyte of the capacitor, e.g. $MnO_2$, is produced in intimate contact with the anodic oxide layer of the sintered pellet by impregnation of the anode body with a solution of a semiconducting oxide precursor, followed by pyrolysis of the precursor to form the semiconducting oxide. This impregnation-pyrolysis sequence is repeated as many as 14 times to build up the semiconducting oxide layer to the proper thickness. The pyrolysis temperature is normally from about 300° C. to 450° C. The production of the solid electrolyte, e.g. $MnO_2$, results in an outer layer of irregular dimension. This outer layer has a plurality of outwardly extending rough areas or burrs, which vary from unit to unit in the successive preparation of a number of units.

In order to smooth the surface, it has been necessary in the past to mechanically abrade the burrs from the pellets by means of a grinder. It is evident that this smoothening operation involves a considerable loss of time and material. The repeated pyrolysis and the sizing treatment subjects the units to a considerable stress and this treatment is generally considered by the art to be a severe condition which tends to degrade the units.

A prior art process coping with the problem of rough areas or burrs in the outer layer of $MnO_2$ coated pellets which has successfully eliminated the problem is U.S. 3,241,008, issued to Joseph A. Komisarek. This process involves impregnating a porous body of sintered, surface-oxidized tantalum particles with a manganous salt solution followed by thermal decomposition of the salt to the oxide. This sequence is repeated a multiplicity of times to completely fill the interstices between the particles with manganese dioxide. Thereafter, the resulting body is coated with a viscous mixture of finely divided silica and additional manganous salt. This coating is then calcined to yield a smooth $MnO_2$ surface. The patent describes the viscous mixture as "a thixotropic mixture" of manganous nitrate and finely divided silica. This thixotropic mixture is also referred to as "a mangagel." It has been observed that although this invention eliminates the extremely rough and non-uniform surface of the capacitor units, considerable control and time is required in order to obtain and maintain the manganous nitrate and silica mixture in the desired thixotropic state.

SUMMARY OF THE INVENTION

It is an object of the present invention to present a process for preparing a solid electrolyte capacitor involving a fewer number of pyrolysis steps than is normally required.

It is a further object of the present invention to present a process yielding more stable capacitors in greater yield.

It is another object of the present invention to present a process which permits batch processing.

A further object of the invention is to present a process requiring less control than the prior art processes.

It is yet another object of the present invention to present a process which eliminates the necessity of sizing the capacitor units prior to application of the cathode contact material.

It is still another object of the present invention to present a process which reduces the overall processing time.

A further object is to present a process for preparing solid electrolyte anodes of uniform profile.

This invention relates to a process for producing a solid electrolyte capacitor comprising immersing a porous, valve-metal body, which has an oxide of the valve-metal on the surface thereof, into a $Mn(NO_3)_2$-$SiO_2$ sol. Removing the $Mn(NO_3)_2$-$SiO_2$ coated unit and pyrolytically decomposing said coating to convert the nitrate therein to a smooth coating of semiconducting manganese dioxide containing silica about said body. The valve-metal body may be at room temperature, i.e. 68–72° F. when immersed in the sol.

In a more limited embodiment, the valve-metal oxide coated porous valve-metal body is reduced in temperature to a point below the crystallization temperature of the manganous nitrate-silica sol. The cold body is then immersed into the sol to cause crystallization and adherence of a comparatively thick coating of said sol about said body. The unit is then removed and the nitrate of said coating is pyrolytically decomposed to a smooth coating of semiconducting manganese dioxide containing silica about said body.

In another limited and more preferred embodiment, the valve-metal oxide coated porous valve-metal body is heated and immersed into the manganous nitrate-silica sol so as to cause local gelling and adherence of a comparatively thick coating of manganous nitrate-silica gel on said body. Thereafter, the coated unit is removed and subjected to a temperature sufficient to pyrolytically decompose said coating to convert the $Mn(NO_3)_2$ of said gel to a smooth coating of semiconducting oxide containing silica about said body. In a variation of this preferred embodiment, the unit may be heated to a temperature between about 300–450° C. which will first cause decomposition of some of the nitrate to the oxide as the unit is immersed into the sol and as the temperature decreases, an adhering gel will envelope the unit. The unit will then be removed from the sol and subjected to a pyrolyzing temperature to convert the adhering gel to additional semiconducting $MnO_2$.

It will be noted that the invention involves immersing the anodized pellets into the sol while said pellets are either at room temperature, at a comparatively low temperature or a comparatively high temperature, with the latter alternative being preferred for reasons which will be mentioned infra. No matter which temperature condition is selected, it is preferred that a preliminary, more or less conventional pyrolysis step be performed. This involves impregnating the anodized porous valve-metal body with a solution of a semiconducting oxide precursor, e.g. a water solution of $Mn(NO_3)_2$. The impregnated body is then heated to pyrolytically decompose the impregnant to an extremely thin coating of semiconducting oxide. This preliminary step tends to insure the location of some $MnO_2$ in the interior-most areas of the interstices of the porous pellets.

It is theorized that in the prior art gel system, water-$Mn(NO_3)_3$-$SiO_2$, the water is held by a loose network formed by hydrogen bonding between the oxygen of the silica and the hydrogen of the water. The nitrate is in true solution in the water and trapped within the network. In the sol system, water-$Mn(NO_3)_2$-$SiO_2$ of the present invention there is merely a loose association as distinguished from a loose network. The sol state is comparatively stable as far as viscosity is concerned and once formed can be held for months without further adjustment or treatment. On heating, the sol will be converted to a gel.

The manganous nitrate-silica sol of the present invention is prepared by adding from about 0.5–4% by weight of finely divided silica to a 50–70% solution of manganous nitrate in water and rapidly stirring the mixture to form a permanent hydrosol. Care must be exercised to thoroughly agitate and stir the mixture in order to form the hydrosol. Insufficient stirring with or without heating of the mixture will tend to form a gel. The preferred form of silica is chemically pure, expanded, moisture free and in a very fine state of subdivision, e.g. 0.015–0.02 micron. Two products sold under the tradenames "Cabosil" and "Santocel" may be employed herein.

The step of immersing the anode body in the manganous nitrate-silica sol, followed by pyrolysis of the adhering manganous nitrate-silica layer can be repeated up to 6 or 7 times. Usually 3 or 4 times suffice depending upon the rating of the capacitor. The resulting coating is smooth and even and needs no sizing. By the present process, the subjecting of the anode units to about 14 dips each, followed by 14 high temperature pyrolyzing steps with sizing, is avoided and stable units result with a fewer number of total rejections.

BRIEF DESCRIPTION OF THE DRAWING

The invention is illustrated by the accompanying drawing in which.

DETAILED DESCRIPTION OF THE INVENTION

Example I

Figure 1:
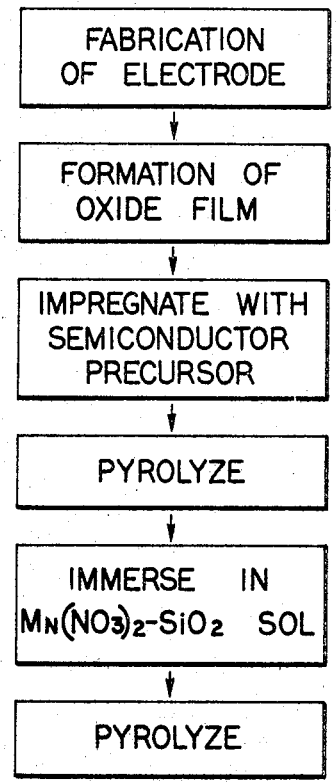
FIGURE 1 is a flow sheet of the process of the present invention and FIGURE 2 is a cross section of a capacitor formed by said process. Referring to the drawing, the electrode 10 is first fabricated from a valve metal by compressing and sintering valve metal particles to form a rigid porous sintered pellet. This constitutes the anode of the capacitor. A wire lead 13 is affixed to the pellet. The electrode 10 is made the anode for forming a valve metal oxide layer 11 over the entire surface of the body, including the internal surfaces of the interstices thereof. The anodized electrode is impregnated with a solution of a semiconducting oxide precursor. The impregnated unit is then heated to pyrolyze the impregnant to the semiconducting oxide 12. The unit is then immersed in a $Mn(NO_3)_2$-$SiO_2$ sol. The unit is then removed and the adhering film is subjected to a temperature sufficient to decompose the manganous nitrate to additional semiconducting oxide 12.
Figure 2:
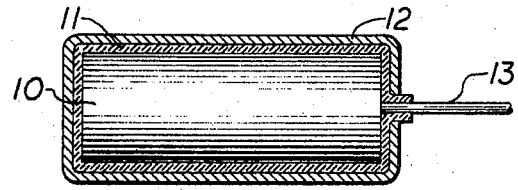

A group of porous elecrodes is produced by compressing and sintering tantalum particles. A short length of tantalum wire is affixed to each body. Thereafter, the porous electrodes are suspended in a liquid electrolyte which permeates each body. The electrodes are made the anodes for forming a tantalum oxide layer over the entire surface of each body, including the internal surfaces of the interstices thereof. The formed electrodes are impregnated with a solution of manganous nitrate. The units are then heated to a temperature sufficient to pyrolize the manganous nitrate to manganese dioxide. This temperature is preferably between 300 and 450° C.

While the units are still at this temperature, they are immediately immersed in a $Mn(NO_3)_2$-$SiO_2$ sol. The sol of this example was prepared by adding 8.5 grams of colloidal $SiO_2$ to 400 grams of a 65% solution of manganous nitrate in water, and rapidly stirring the mixture to form a permanent hydrosol. This solution was maintained and used at room temperature. When the hot units are immersed into the hydrosol, some manganous nitrate immediately adjacent the formed anodes is pyrolyzed to $MnO_2$, depositing the same on the surfaces and into the interstices of the formed anodes. As the bodies give off their heat to the immediately adjacent solution, the non-thixotropic sol is transformed into a gel immediately adjacent the anode and a comparatively thick coating of manganous nitrate-silica adheres about said body.

The units are then removed from the sol and subjected to a temperature high enough to decompose the manganous nitrate to $NnO_2$. Generally the decomposing temperature is about 400° C. If heavier coatings are desired, this cycle can be repeated several times. When this is desired, the units will be merely transferred from the pyrolytic source of heat, e.g. from an oven, into the sol and back again into the source of heat. After the last pyrolysis step, the units are cooled to room temperature and placed in a formation electrolyte and the tantalum oxide layer on the tantalum pellets is electrolytically reformed.

The outer shell of $NnO_2$ on the units is extremely smooth thus eliminating the need for physically sizing the units. Carbon and silver cathodic contact coatings are then applied to the surface of the $NnO_2$ of each unit in a fashion familiar to those skilled in the art and the units are then encapsulated. The capacitors formed by this process were electrically excellent.

It is preferred that the sequence of dipping the heated anodes into the sol followed by pyrolysis of the nitrate is repeated three or four times. In no instance was it found necessary to repeat the sequence more than seven times. Thus, the process has the outstanding advantage of not subjecting the components to the normal 14 pyrolysis steps.

Example II

As in Example I, a group of tantalum anodes is prepared, anodized and impregnated with a solution of manganous nitrate and said nitrate pyrolyzed to manganese dioxide. Following this pyrolysis, the units are cooled to a temperature of −55° C. The cooled units are then immediately immersed into the same $Mn(NO_3)_2$-$SiO_2$ sol as employed in Example I. The cooled units crystallize the nitrate-silica sol immediately adjacent the surface of the units and a comparatively thick coating or shell of the crystallized solution adheres to the outer surfaces of the units. Thereafter, as the units are subjected to a pyrolyzing temperature, the temperature of the adhering sol rapidly rises and the heat causes the nitrate-silica system to be converted from a crystallized sol to an adhering gel. By being converted to a gel, the manganous nitrate is effectively held in place about the unit until it is pyrolytically converted to manganese dioxide. If the crystallized coating had been merely a crystallized water solution of manganous nitrate, then on being subjected to a pyrolyzing temperature the crystals would have melted and the solution would tend to run from the units. The decomposing temperature employed herein is about 400° C. The units are then cooled to room temperature and placed in a formation electrolyte and the tantalum oxide layer on the tantalum pellet is electrolytically reformed. The units are then dried and a cathode contact is applied to the surface of the $MnO_2$. The resulting units were electrically excellent.

When a thicker coating of $MnO_2$ is desired, the cooling and pyrolysis sequence can be repeated two or three times, but in no instance does the sequence have to be repeated more than seven times. The units should be reduced to a temperature sufficient to cause crystallization of the sol surrounding each unit and to cause adherence of a comparatively thick layer of this crystallized sol to each pellet. For example, while 0° C. would cause some crystallization, the adhering layer would be quite thin. The same is true for about −10° C.; this temperature would cause some crystallization but the adhering gel would not be very thick. The preferred temperature should be lower than −15° C. The lower limit is dictated only by practical considerations. There is no advantage in cooling the units below about −130° C.

While Examples I and II have illustrated the use of opposite temperature extremes in carrying out the present invention, it is to be understood that there are advantages over the present commercial processes in immersing anodized pellets which are at about standard room temperature. Thus, instead of heating the anodized pellets to a temperature high enough to either locally gel the sol or high enough to initially pyrolyze the sol and then locally gel the sol, or instead of cooling the anodes to a comparatively low temperature, the anodes may be immersed in the sol while they are at a temperature of about 68 to 72° F. This room temperature dip followed by pyrolysis sequence when repeated three or four times yields an anodized pellet having an extremely smooth layer of semiconducting $MnO_2$. As indicated previously, however, the hot dip followed by the pyrolysis method is far more advantageous than either of th other two. When employing the hot dip process, the units can be taken directly from the pyrolysis means and immersed immediately in the nitrate-silica sol. Thus, there is no cool down time necessary and no special cooling means is needed.

The anodes contemplated herein may be any of the valve metals, tantalum, aluminum, etc. in any form but particularly in the form of a porous, sintered pellet. The formation electrolyte may be any of the prior art electrolytes which will effectively yield a metal oxide on the valve metal surface; for example, ammonium chloride, ammonium acetate, ammonium nitrate, ammonium formate, phosphoric acid, etc.

The foregoing description of the invention is to be considered as illustrative of the invention and is not to be limited to the specific materials described. For example, other oxygen-containing percursors of manganese dioxide may be employed in place of manganous nitrate, and other heat sensitized gelling agents may be used in place of the $SiO_2$. The details of anodizing, depositing the $MnO_2$ coating, reformation, etc are disclosed in greater detail in U.S. 2,936,514 and described here only to the extent necessary to form a setting for the invention.

What is claimed is:

1. A process for producing a solid electrolyte capacitor comprising, forming a $Mn(NO_3)_2$-$SiO_2$ sol by adding 0.5–4% by weight finely divided silica to a 50–70% solution of manganous nitrate in water and rapidly stirring the mixture to form a hydrosol, immersing a porous anodized valve metal body into said $Mn(NO_3)_2$-$SiO_2$ sol, removing the $Mn(NO_3)_2$-$SiO_2$ coated unit from said sol, and subjecting said coated unit to a temperature sufficient to convert the $Mn(NO_3)_2$-$SiO_2$ to a comparatively smooth coating of $MnO_2$ containing $SiO_2$.

2. The process of claim 1 wherein said body is at room temperature when immersed into said sol.

3. The process of claim 2 wherein prior to immersion of said body in said sol, said body is impregnated with a water solution of a semiconducting oxide precursor and said impregnant is pyrolytically decomposed to the semiconducting oxide.

4. The process of claim 3 wherein the immersing and pyrolysis sequence is repeated up to about seven times.

5. The process of claim 1 wherein said body is reduced in temperature to a point below the crystallization temperature of said sol when immersed in said sol.

6. The process of claim 5 wherein said temperature is below −15° C.

7. The process of claim 5 wherein prior to immersion of said body in said sol, said body is impregnated with a water solution of a semiconducting oxide precursor and said impregnant is pyrolytically decomposed to the semiconducting oxide.

8. The process of claim 7 wherein the immersing and pyrolysis sequence is repeated up to about seven times.

9. The process of claim 1 wherein, when immersed in said sol, said body is at a temperature at least sufficient to cause local gelling of said sol and adherence of a comparatively thick coating of $Mn(NO_3)_2$-$SiO_2$ gel on said body.

10. The process of claim 9 wherein said body is at a temperature between about 300–450° C. when immersed in said sol.

11. The process of claim 9 wherein prior to immersion of said body in said sol, said body is impregnated with a water solution of a semiconducting oxide precursor and said impregnant is pyrolytically decomposed to the semiconducting oxide.

12. The process of claim 11 wherein the immersing and pyrolysis sequence is repeated up to about seven times.

References Cited

UNITED STATES PATENTS

| | | | |
|---|---|---|---|
| 2,936,514 | 5/1960 | Millard | 29—570 |
| 3,241,008 | 3/1966 | Komisarek | 29—570 |
| 3,182,376 | 5/1965 | Sprague et al. | 29—25.41 |
| 3,299,325 | 1/1967 | Wagener et al. | 29—570 XR |
| 3,337,429 | 8/1967 | Zind | 29—570 |

JOHN F. CAMPBELL, Primary Examiner

R. B. LAZARUS, Assistant Examiner

U.S. Cl. X.R.

29—25.41